(12) United States Patent
Kawasaki et al.

(10) Patent No.: US 9,828,682 B2
(45) Date of Patent: Nov. 28, 2017

(54) DIFFERENTIAL PRESSURE WATER ELECTROLYSIS APPARATUS

(71) Applicant: HONDA MOTOR CO., LTD., Tokyo (JP)

(72) Inventors: Nobuyuki Kawasaki, Wako (JP); Eiji Haryu, Wako (JP); Hiroyuki Ishikawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 94 days.

(21) Appl. No.: 14/846,828

(22) Filed: Sep. 7, 2015

(65) Prior Publication Data

US 2016/0083854 A1    Mar. 24, 2016

(30) Foreign Application Priority Data

Sep. 18, 2014  (JP) .................. 2014-189751

(51) Int. Cl.
C25B 1/12        (2006.01)
C25B 9/20        (2006.01)
C25B 9/10        (2006.01)

(52) U.S. Cl.
CPC ............. *C25B 1/12* (2013.01); *C25B 9/10* (2013.01); *C25B 9/20* (2013.01); *Y02E 60/366* (2013.01)

(58) Field of Classification Search
None
See application file for complete search history.

(56) References Cited

U.S. PATENT DOCUMENTS 4,748,092 A * 5/1988 Hekal ............... H01M 8/0273
                                              204/253
6,365,032 B1 * 4/2002 Shiepe ................. C25B 1/12
                                              204/279

(Continued)

FOREIGN PATENT DOCUMENTS

JP    2008-121086    5/2008
JP    2014-105340    6/2014

OTHER PUBLICATIONS

Japanese Office Action for corresponding JP Application No. 2014-189751, dated Jan. 10, 2017 (w/ English machine translation).

*Primary Examiner* — Harry D Wilkins, III
(74) *Attorney, Agent, or Firm* — Mori & Ward, LLP (57) ABSTRACT

A differential pressure water electrolysis apparatus includes high-pressure water electrolysis cells and a pressing mechanism. The high-pressure water electrolysis cells are stacked in a stacking direction. Each of the high-pressure water electrolysis cells includes an electrolyte membrane, a member, an anode current collector, a cathode current collector, an anode separator, and a cathode separator. The electrolyte membrane has a first side and a second side opposite to the first side in the stacking direction. The member has a surface which has an opening and which is in contact with the electrolyte membrane. The anode current collector is disposed on the first side of the electrolyte membrane. The cathode current collector is disposed on the second side of the electrolyte membrane. The anode separator has an anode chamber in which the anode current collector is accommodated. The pressing mechanism is to press the high-pressure water electrolysis cells in the stacking direction.

16 Claims, 9 Drawing Sheets

(56) References Cited

U.S. PATENT DOCUMENTS

| | | | | |
|---|---|---|---|---|
| 6,613,215 B2* | 9/2003 | Molter | ............... | C25B 1/10 |
| | | | | 204/263 |
| 6,783,885 B2* | 8/2004 | Shiepe | ............... | C25B 15/00 |
| | | | | 204/254 |
| 7,153,409 B2* | 12/2006 | Shiepe | ............... | B82Y 30/00 |
| | | | | 204/252 |
| 7,993,499 B2* | 8/2011 | Zuber | ............... | C25B 9/10 |
| | | | | 204/252 |
| 9,487,871 B2* | 11/2016 | Nakazawa | ............... | C25B 9/08 |
| 2014/0151217 A1* | 6/2014 | Nakazawa | ............... | C25B 9/08 |
| | | | | 204/266 |
| 2015/0114831 A1* | 4/2015 | Kawasaki | ............... | C25B 9/10 |
| | | | | 204/252 |

* cited by examiner

DIFFERENTIAL PRESSURE WATER ELECTROLYSIS APPARATUS

CROSS-REFERENCE TO RELATED APPLICATIONS

The present application claims priority under 35 U.S.C. §119 to Japanese Patent Application No. 2014-189751, filed Sep. 18, 2014, entitled "Differential-Pressure-Type High-Pressure Water Electrolysis Apparatus." The contents of this application are incorporated herein by reference in their entirety.

BACKGROUND

1. Field

The present disclosure relates to a differential pressure water electrolysis apparatus.

2. Description of the Related Art

In general, hydrogen is used as a fuel gas used for a power-generation reaction in a fuel cell. The hydrogen is generated by, for example, a water-electrolysis apparatus. Since a water-electrolysis apparatus generates hydrogen (and oxygen) by electrolyzing water, the water-electrolysis apparatus uses a solid polymer electrolyte membrane (ion exchange membrane).

Electrode catalyst layers are formed on two surfaces of a solid polymer electrolyte membrane in such a manner as to form an electrolyte membrane/electrode structure, and a current collector is disposed on each side of the electrolyte membrane/electrode structure to form a water electrolysis cell.

In a water electrolysis apparatus that includes a plurality of water electrolysis cells stacked on top of one another, a voltage is applied to the ends of the water electrolysis apparatus in the direction in which the water electrolysis cells are stacked on top of one another, and water is supplied to an anode current collector of each of the water electrolysis cells. Accordingly, the water is decomposed on an anode side of an electrolyte membrane/electrode structure of each of the water electrolysis cells, resulting in generation of hydrogen ions (protons), which move to a cathode side by passing through a solid polymer electrolyte membrane and combine with electrons in a cathode current collector, so that hydrogen is generated. On the anode side, oxygen generated along with the hydrogen is discharged from each of the water electrolysis cells with surplus water.

An example of this type of water electrolysis apparatus is a differential pressure water electrolysis apparatus that generates, by water electrolysis, oxygen on an anode side and generates high-pressure hydrogen having a pressure higher than that of the oxygen on a cathode side. In the case of such a differential pressure water electrolysis apparatus, there is a problem in that high-pressure hydrogen is likely to separate a solid polymer electrolyte membrane and a cathode current collector from each other, which in turn leads to a decrease in electrolysis efficiency.

Accordingly, for example, a high-pressure-hydrogen generation apparatus disclosed in Japanese Unexamined Patent Application Publication No. 2008-121086 is known. This high-pressure-hydrogen generation apparatus includes a piston, which presses a cathode separator against a cathode current collector and a solid polymer electrolyte membrane, and a cylinder that accommodates the piston in such a manner that the piston is able to be freely moved into and out of the cylinder. A cathode-side fluid path and the cylinder are connected by a connection path, and a portion of high-pressure hydrogen gas generated in the cathode-side fluid path is introduced into the cylinder. An elastic body that urges the piston in a direction toward the solid polymer electrolyte membrane is disposed in the cylinder.

A pressure-receiving area of the piston that receives the pressure from the high-pressure hydrogen gas in the cylinder, the area of a surface of the cathode separator, the surface being in contact with the solid polymer electrolyte membrane, and stress that acts on the elastic body are adjusted. Thus, the space between the solid polymer electrolyte membrane and the cathode current collector may be minimized, and improved electrolysis efficiency may be obtained.

SUMMARY

According to one aspect of the present invention, a differential pressure water electrolysis apparatus includes a plurality of high-pressure water electrolysis cells and a pressing mechanism. The plurality of high-pressure water electrolysis cells are stacked on top of one another. The pressing mechanism presses the high-pressure water electrolysis cells, which are stacked on top of one another, in a direction in which the high-pressure water electrolysis cells are stacked on top of one another. Each of the plurality of high-pressure water electrolysis cells includes an electrolyte membrane, an anode current collector and a cathode current collector that are disposed at either side of the electrolyte membrane, an anode separator that has an anode chamber in which the anode current collector is accommodated, and a cathode separator that has a cathode chamber in which the cathode current collector is accommodated. Each of the plurality of high-pressure water electrolysis cells electrolyzes water, which is supplied to the high-pressure water electrolysis cell, in such a manner as to generate oxygen on a side on which the anode current collector is disposed and high-pressure hydrogen having a pressure higher than a pressure of the oxygen on a side on which the cathode current collector is disposed. One or more openings are formed on a surface of a member that is in contact with the electrolyte membrane.

According to another aspect of the present invention, a differential pressure water electrolysis apparatus includes high-pressure water electrolysis cells and a pressing mechanism. The high-pressure water electrolysis cells are stacked in a stacking direction. Each of the high-pressure water electrolysis cells includes an electrolyte membrane, a member, an anode current collector, a cathode current collector, an anode separator, and a cathode separator. The electrolyte membrane has a first side and a second side opposite to the first side in the stacking direction. The member has a surface which has an opening and which is in contact with the electrolyte membrane. The anode current collector is disposed on the first side of the electrolyte membrane. The cathode current collector is disposed on the second side of the electrolyte membrane. The anode separator has an anode chamber in which the anode current collector is accommodated. The cathode separator has a cathode chamber in which the cathode current collector is accommodated. Each of the high-pressure water electrolysis cells are to electrolyze water supplied to each of the high-pressure water electrolysis cells to generate oxygen on an anode current collector side on which the anode current collector is disposed and to generate high-pressure hydrogen having a pressure higher than a pressure of the oxygen on a cathode current collector side on which the cathode current collector is disposed. The pressing mechanism is to press the high-pressure water electrolysis cells in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
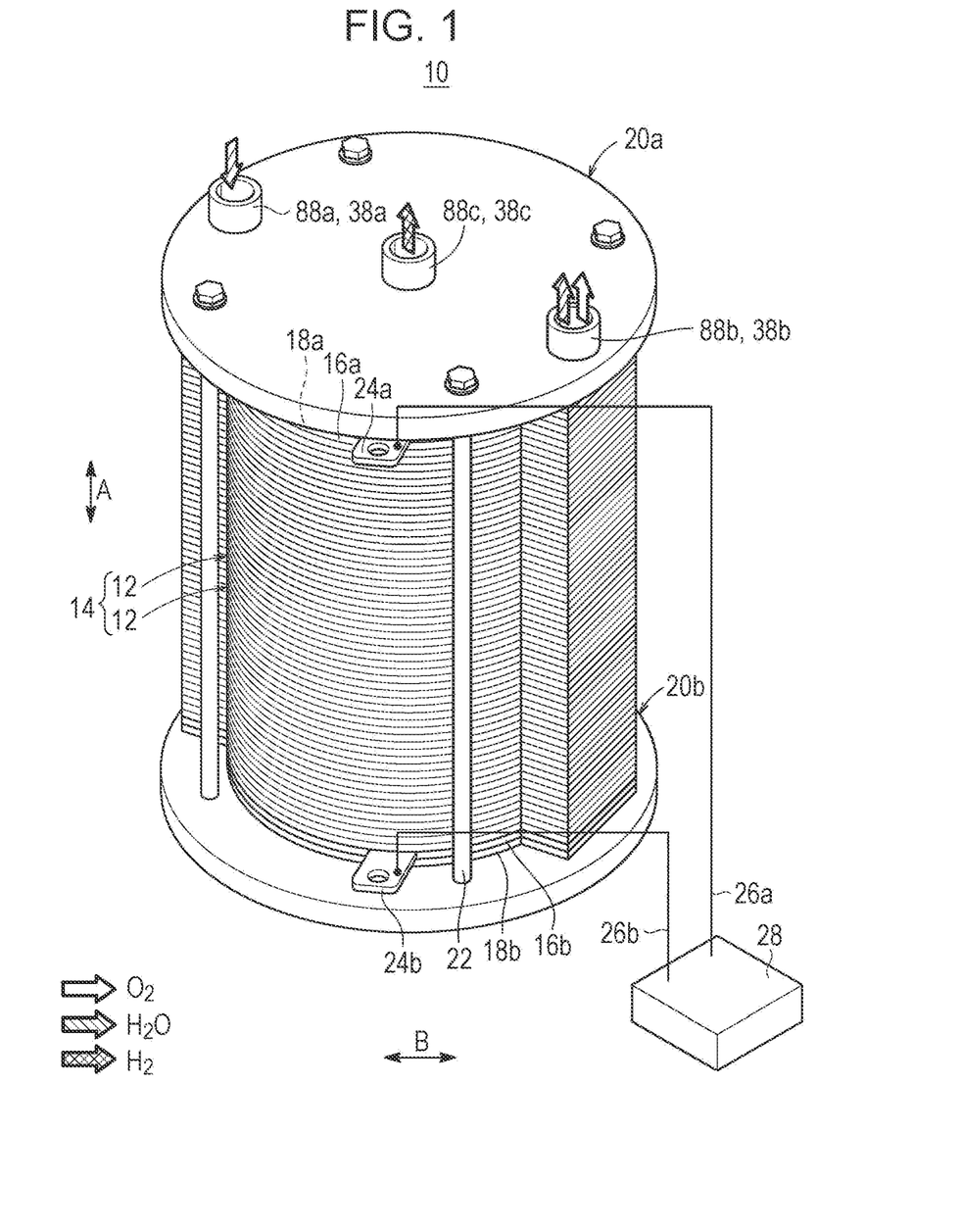
FIG. 1 is a perspective view of a differential pressure water electrolysis apparatus according to a first embodiment of the present disclosure.

As illustrated in FIG. 1, a differential pressure water electrolysis apparatus 10 according to a first embodiment of the present disclosure includes a multilayer body 14 formed of a plurality of high-pressure water electrolysis cells 12 that are stacked on top of one another in the vertical direction (direction of arrow A) or in the horizontal direction (direction of arrow B).

A terminal plate 16a, an insulating plate 18a, and an end plate 20a are sequentially arranged in an upward direction at one end (upper end) of the multilayer body 14 in the direction in which the plurality of high-pressure water electrolysis cells 12 are stacked on top of one another (hereinafter referred to as stacking direction). Similarly, a terminal plate 16b, an insulating plate 18b, and an end plate 20b are sequentially arranged in a downward direction at the other end (lower end) of the multilayer body 14 in the stacking direction.

The differential pressure water electrolysis apparatus 10 includes a pressing mechanism, and the end plates 20a and 20b, each having a disc-like shape, are integrally tightened and held with, for example, four tie rods 22 each extending in the direction of arrow A interposed therebetween and fastened in the stacking direction. Note that the differential pressure water electrolysis apparatus 10 may have a configuration in which the differential pressure water electrolysis apparatus 10 is integrally held by a box-shaped casing (not illustrated) that includes the end plates 20a and 20b as end plates of the box-shaped casing. In addition, although the overall shape of the differential pressure water electrolysis apparatus 10 is a substantially columnar shape, the overall shape of the differential pressure water electrolysis apparatus 10 may be one of various shapes, such as a cubic shape.

A terminal portion 24a projects outward from a side portion of the terminal plate 16a, and a terminal portion 24b projects outward from a side portion of the terminal plate 16b. The terminal portion 24a is electrically connected to an electrolytic power supply 28 via a wiring line 26a, and the terminal portion 24b is electrically connected to the electrolytic power supply 28 via a wiring line 26b.

Figure 2:
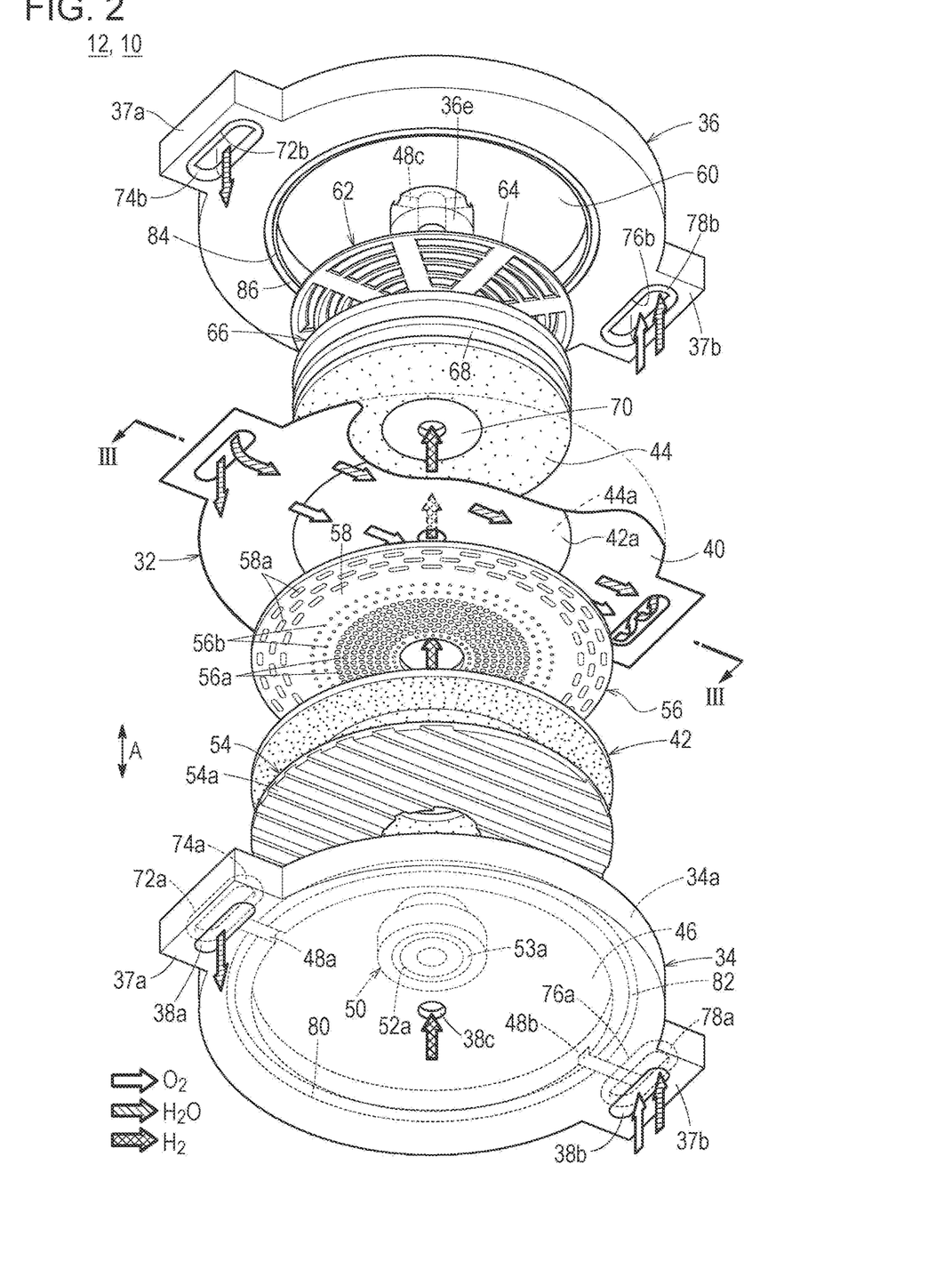
FIG. 2 is an exploded perspective view of a high-pressure water electrolysis cell that is included in the differential pressure water electrolysis apparatus.
Figure 3:
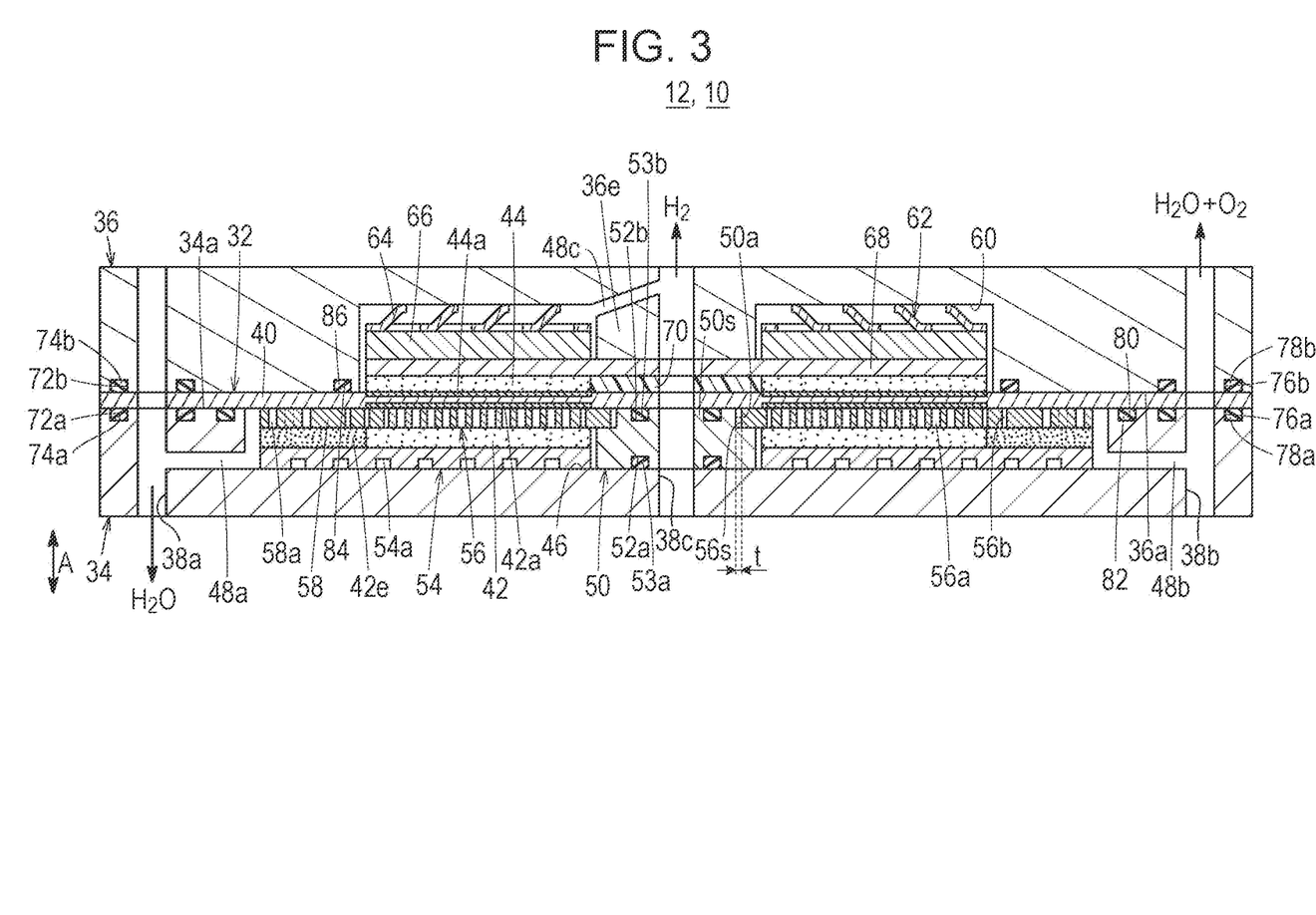
FIG. 3 is a sectional view of the high-pressure water electrolysis cell taken along line III-III of FIG. 2.

As illustrated in FIG. 2 and FIG. 3, each of the high-pressure water electrolysis cells 12 includes an electrolyte membrane/electrode structure 32 having a substantially disc-like shape, an anode separator 34, and a cathode separator 36, the electrolyte membrane/electrode structure 32 being sandwiched between the anode separator 34 and the cathode separator 36. Since the plurality of high-pressure water electrolysis cells 12 have the same configuration, one of the high-pressure water electrolysis cells 12, which is illustrated in FIG. 2 and FIG. 3, will be described below as a representative example.

As illustrated in FIG. 2, a first projecting portion 37a and a second projecting portion 37b projecting outward in the surface direction of the anode and cathode separators 34 and 36 are formed in outer peripheral edge portions of the high-pressure water electrolysis cell 12, and the projecting direction of the first projecting portion 37a and the projecting direction of the second projecting portion 37b are opposite to each other. A water-supply manifold 38a used for supplying water (pure water) is formed in the first projecting portion 37a. The water-supply manifolds 38a formed in the first projecting portions 37a of the high-pressure water electrolysis cells 12 are in communication with one another in the stacking direction (direction of arrow A). A water-discharge manifold 38b used for discharging oxygen and unreacted water (mixed fluid), which are generated by an anodic reaction, is formed in the second projecting portion 37b. The water-discharge manifolds 38b formed in the second projecting portions 37b of the high-pressure water electrolysis cells 12 are in communication with one another in the stacking direction.

A high-pressure-hydrogen manifold 38c extending through substantially the center of an electrolytic region is formed in a center portion of the high-pressure water electrolysis cell 12 (see FIG. 2 and FIG. 3). The high-pressure-hydrogen manifolds 38c of the high-pressure water electrolysis cells 12 are in communication with one another in the stacking direction, and high-pressure hydrogen generated by the anodic reaction (hydrogen at a pressure higher than the pressure of the generated oxygen) (e.g., 1 MPa to 70 MPa) is discharged via the high-pressure-hydrogen manifolds 38c.

The anode separator 34 and the cathode separator 36 each has a substantially disc-like shape and are each formed of, for example, a carbon member or the like. The anode separator 34 and the cathode separator 36 may be formed by performing press forming on other members such as steel sheets, stainless steel sheets, titanium sheets, aluminum sheets, coated steel sheets, and metal sheets each having a surface on which a corrosion-resistant treatment has been performed. Alternatively, the anode separator 34 and the cathode separator 36 may be formed by performing a corrosion-resistant treatment on such members after a cutting operation.

The electrolyte membrane/electrode structure 32 includes a solid polymer electrolyte membrane (electrolyte membrane) 40 having a substantially ring-like shape. The solid polymer electrolyte membrane 40 is sandwiched between an anode current collector 42 and a cathode current collector 44, each of which has a ring-like shape and each of which is used for electrolysis. The solid polymer electrolyte membrane 40 is formed of, for example, a hydrocarbon (HC) membrane or a fluorocarbon membrane.

The solid polymer electrolyte membrane 40 has the high-pressure-hydrogen manifold 38c in a substantially central portion thereof. An anode-electrode-catalyst layer 42a having a ring-like shape is formed on one surface of the solid polymer electrolyte membrane 40. A cathode-electrode-catalyst layer 44a having a ring-like shape is formed on the other surface of the solid polymer electrolyte membrane 40. The anode-electrode-catalyst layer 42a is made of, for example, a ruthenium (Ru)-based catalyst, and the cathode-electrode-catalyst layer 44a is made of, for example, a platinum catalyst.

The anode current collector 42 and the cathode current collector 44 are each made of, for example, a sintered compact of spherical atomized titanium powder (porous electric conductor). Each of the anode current collector 42 and the cathode current collector 44 has a smooth surface portion that is etched after a cutting operation has been performed on the smooth surface portion, and the porosity of each of the anode current collector 42 and the cathode current collector 44 is set to be within a range of 10% to 50% and preferably to be within a range of 20% to 40%. A frame portion 42e is fitted to the outer peripheral edge of the anode current collector 42. The frame portion 42e is formed so as to be denser than the anode current collector 42. Note that an outer circumferential portion of the anode current collector 42 may be densely formed in such a manner as to serve as the frame portion 42e.

An anode chamber 46 is formed by forming a ring-shaped recess in a surface 34a of the anode separator 34, the surface 34a facing the electrolyte membrane/electrode structure 32. In the anode chamber 46, a supply path 48a, which is in communication with the water-supply manifold 38a, and a discharge path 48b, which is in communication with the water-discharge manifold 38b, are in communication with each other.

A knock member 50 is disposed between the anode chamber 46 and the high-pressure-hydrogen manifold 38c. The knock member 50 has a substantially cylindrical shape and has the high-pressure-hydrogen manifold 38c in a center portion thereof. A step portion 50a is formed at one end of the knock member 50 in the axial direction of the knock member 50 in such a manner as to form an end portion 50s having a small diameter.

In a first end surface of the knock member 50, the first end surface facing the anode separator 34, a sealing groove 52a is formed in such a manner as to extend around the high-pressure-hydrogen manifold 38c, and a sealing member 53a is disposed in the sealing groove 52a. In a second end surface of the knock member 50, the second end surface facing the solid polymer electrolyte membrane 40, a sealing groove 52b is formed in such a manner as to extend around the high-pressure-hydrogen manifold 38c, and a sealing member 53b is disposed in the sealing groove 52b.

A water-flow-path member 54 is disposed on a surface of the anode current collector 42, the surface facing the bottom surface of the anode chamber 46. Water-flow paths 54a, which are in communication with the supply path 48a and the discharge path 48b, are formed in the water-flow-path member 54. As illustrated in FIG. 2, the water-flow paths 54a are formed of a plurality of grooves extending in parallel to one another in the horizontal direction.

The anode current collector 42 and a ring-shaped protective-sheet member 56, which is interposed between the anode current collector 42 and the solid polymer electrolyte membrane 40, are disposed in the anode chamber 46. An inner periphery 56s of the protective-sheet member 56 is positioned within the inner peripheries of the anode current collector 42 and the cathode current collector 44, and the outer periphery of the protective-sheet member 56 is positioned outside the outer periphery of a cathode-chamber-sealing groove 84, which will be described later. The inner periphery 56s of the protective-sheet member 56 is located at the position of the step portion 50a of the knock member 50, and a space t is formed between the inner periphery 56s and the outer periphery of the end portion 50s when the protective-sheet member 56 is held.

The protective-sheet member 56 has a plurality of first through holes 56a that are formed in a region (electrolytic region) facing the anode-electrode-catalyst layer 42a in the stacking direction and a plurality of second through holes 56b that are formed in radial directions at positions outside the first through holes 56a. The density at which the first through holes 56a are arranged is larger than the density at which the second through holes 56b are arranged, and the opening diameter of each of the first through holes 56a is larger than the opening diameter of each of the second through holes 56b.

The protective-sheet member 56 includes a frame portion 58 outside the electrolytic region. The frame portion 58 has a plurality of openings (e.g., rectangular holes 58a) that are formed in radial directions at positions outside a cathode-chamber-sealing member 86, which will be described later. As illustrated in FIG. 2, the long sides of the holes 58a extend in a circumferential direction of the frame portion 58, and the holes 58a are alternately arranged in a plurality of rows (e.g., three rows) in the radial directions.

As illustrated in FIG. 2 and FIG. 3, a cathode chamber 60 is formed by cutting out a surface 36a of the cathode separator 36 in a substantially ring-like shape, the surface 36a facing the solid polymer electrolyte membrane 40. The cathode current collector 44 and a load-applying mechanism 62 that presses the cathode current collector 44 against the solid polymer electrolyte membrane 40 are disposed in the cathode chamber 60.

The load-applying mechanism 62 includes an elastic member (e.g., plate spring 64), and the plate spring 64 applies a load to the cathode current collector 44 via a metallic-plate-spring holder (shim member) 66. The cathode chamber 60 is in communication with the high-pressure-hydrogen manifold 38c via a hydrogen-discharge path 48c. Note that, instead of the plate spring 64, a disc spring, a coil spring, or the like may be used as the elastic member.

A current-carrying portion 36e is integrally formed with a center portion of the cathode separator 36 in such a manner as to be arranged between the solid polymer electrolyte membrane 40 and the cathode separator 36 and contains the high-pressure-hydrogen manifold 38c. The current-carrying portion 36e may be formed independently of the cathode separator 36 and may be arranged between the cathode separator 36 and the solid polymer electrolyte membrane 40.

A conductive sheet 68 is disposed in such a manner as to integrally extend from a position between the current-carrying portion 36e and the solid polymer electrolyte membrane 40 to a position between the cathode current collector 44 and the plate spring holder 66 (plate spring 64). The conductive sheet 68 is formed of, for example, a metallic sheet made of titanium, SUS, iron, or the like and has a ring-like shape and approximately the same diameter as that of the cathode current collector 44.

An insulating member (e.g., resin sheet 70) is disposed in a center portion of the cathode current collector 44 in such a manner as to be positioned between the conductive sheet 68 and the solid polymer electrolyte membrane 40. The resin sheet 70 has the shape of a disc having a diameter slightly larger than the diameter of the current-carrying portion 36e and is fitted to an inner peripheral surface of the cathode current collector 44. The resin sheet 70 is formed so as to have substantially the same thickness as that of the cathode current collector 44. For example, a polyethylene naphthalate (PEN) film, a polyimide film, or the like is used as the resin sheet 70.

As illustrated in FIG. 2 and FIG. 3, in the first projecting portion 37a of the anode separator 34, a first water-supply-sealing groove 72a is formed in such a manner as to extend around the water-supply manifold 38a. In the first projecting portion 37a of the cathode separator 36, a second water-supply-sealing groove 72b is formed in such a manner as to extend around the water-supply manifold 38a. A first water-supply-sealing member 74a is disposed in the first water-supply-sealing groove 72a, and, on the other hand, a second water-supply-sealing member 74b is disposed in the second water-supply-sealing groove 72b.

In the second projecting portion 37b of the anode separator 34, a first water-discharge-sealing groove 76a is formed in such a manner as to extend around the water-discharge manifold 38b. In the second projecting portion 37b of the cathode separator 36, a second water-discharge-sealing groove 76b is formed in such a manner as to extend around the water-discharge manifold 38b. A first water-discharge-sealing member 78a is disposed in the first water-discharge-sealing groove 76a, and, on the other hand, a second water-discharge-sealing member 78b is disposed in the second water-discharge-sealing groove 76b.

An anode-chamber-sealing groove 80 is formed in the surface 34a of the anode separator 34 in such a manner as to extend around the inside of the anode chamber 46, and an anode-chamber-sealing member 82 is disposed in the anode-chamber-sealing groove 80.

A cathode-chamber-sealing groove 84 is formed in the surface 36a of the cathode separator 36 in such a manner as to extend around the outside of the cathode chamber 60. The cathode-chamber-sealing member 86 is disposed in the cathode-chamber-sealing groove 84.

The first water-supply-sealing member 74a, the second water-supply-sealing member 74b, the first water-discharge-sealing member 78a, the second water-discharge-sealing member 78b, the anode-chamber-sealing member 82, and the cathode-chamber-sealing member 86 are each made of the same sealing material. As each of these sealing members, a seal member, a cushion member, a packing member, or the like that has elasticity and that is made of, for example, EPDM, NBR, a fluoro rubber, a silicone rubber, fluoro silicone rubber, butyl rubber, a natural rubber, styrene rubber, chloroprene, acrylic rubber, or the like is used.

As illustrated in FIG. 1, pipes 88a, 88b, 88c that are respectively in communication with the water-supply manifold 38a, the water-discharge manifold 38b, and the high-pressure-hydrogen manifold 38c are connected to the end plate 20a. Although not illustrated, the pipe 88c is provided with a back-pressure valve (or solenoid valve), and accordingly, the pressure of hydrogen generated in the high-pressure-hydrogen manifold 38c may be kept high.

Operation of the differential pressure water electrolysis apparatus 10, which has the above-described configuration, will be described below.

As illustrated in FIG. 1, water is supplied from the pipe 88a to the water-supply manifold 38a of the differential pressure water electrolysis apparatus 10, and a voltage is applied to the terminal portions 24a and 24b of the terminal plates 16a and 16b by the electrolytic power supply 28, which is electrically connected to the terminal portions 24a and 24b. Thus, as illustrated in FIG. 3, in each of the high-pressure water electrolysis cells 12, the water is supplied from the water-supply manifold 38a to the water-flow paths 54a of the anode separator 34 and flows along the anode current collector 42.

As a result, the water is electrolyzed by the anode-electrode-catalyst layer 42a, and hydrogen ions, electrons, and oxygen are generated. The hydrogen ions generated by an anodic reaction flows to the side on which the cathode-electrode-catalyst layer 44a is present by passing through the solid polymer electrolyte membrane 40 and combine with the electrons to form hydrogen.

Accordingly, the hydrogen flows along a hydrogen-flow path formed within the cathode current collector 44. The hydrogen flows through the high-pressure-hydrogen manifold 38c while the pressure of the hydrogen is kept higher than that of the water-supply manifold 38a, and the hydrogen may be extracted outside the differential pressure water electrolysis apparatus 10. On the other hand, the oxygen and unreacted water generated by the anodic reaction are discharged to the outside of the differential pressure water electrolysis apparatus 10 via the water-discharge manifold 38b.

In this case, as illustrated in FIG. 3, a load applied to the solid polymer electrolyte membrane 40 in the anode chamber 46 and the cathode chamber 60 (high-pressure gas regions) may be expressed by spring load applied by plate spring 64+hydrogen gas pressure. On the other hand, a load applied to the solid polymer electrolyte membrane 40 in a high-pressure compression region defined between the anode separator 34 and the cathode separator 36 may be expressed by cell-fastening load−hydrogen gas pressure (>0).

Accordingly, in the first embodiment, in a region in which a high-pressure compressive force acts on the solid polymer electrolyte membrane 40, the plurality of holes 58a are formed in a member that is in contact with the solid polymer electrolyte membrane 40 (e.g., the frame portion 58 of the protective-sheet member 56). Thus, when fastening load is applied to the solid polymer electrolyte membrane 40 in the stacking direction of the high-pressure water electrolysis cells 12, the solid polymer electrolyte membrane 40 may fit into the plurality of holes 58a.

Therefore, elongation of the solid polymer electrolyte membrane 40 may be suppressed. As a result, advantageous effects in that a reduction in the thickness of the solid polymer electrolyte membrane 40 due to high-pressure compression may be suppressed with certainty with a simple configuration, and that a water-electrolysis operation may be continued efficiently may be obtained.

The plurality of holes 58a are formed in an outer peripheral edge portion (frame portion 58) of the protective-sheet member 56. Since the plurality of first through holes 56a and the plurality of second through holes 56b are formed beforehand in the protective-sheet member 56, it is only necessary to newly form the holes 58a. Therefore, the holes 58a may be easily and economically formed.

In addition, in the first embodiment, the inner periphery 56s of the protective-sheet member 56 is located at the position of the step portion 50a of the knock member 50, and the space t is formed between the inner periphery 56s and the step portion 50a when the protective-sheet member 56 is held. As a result, the solid polymer electrolyte membrane 40 may fit into the space t when the solid polymer electrolyte membrane 40 is caused to elongate in an inner circumferential direction, and the elongation of the solid polymer electrolyte membrane 40 in the inner circumferential direction may be efficiently suppressed.

Furthermore, as illustrated in FIG. 2, the long sides of the holes 58a extend in the circumferential direction, and the holes 58a are alternately arranged in a plurality of rows (e.g., three rows) in the radial directions. Therefore, an area in which the elongation of the solid polymer electrolyte membrane 40 is suppressed is increased, and the elongation of the solid polymer electrolyte membrane 40 may be suppressed as much as possible.

Figure 4:
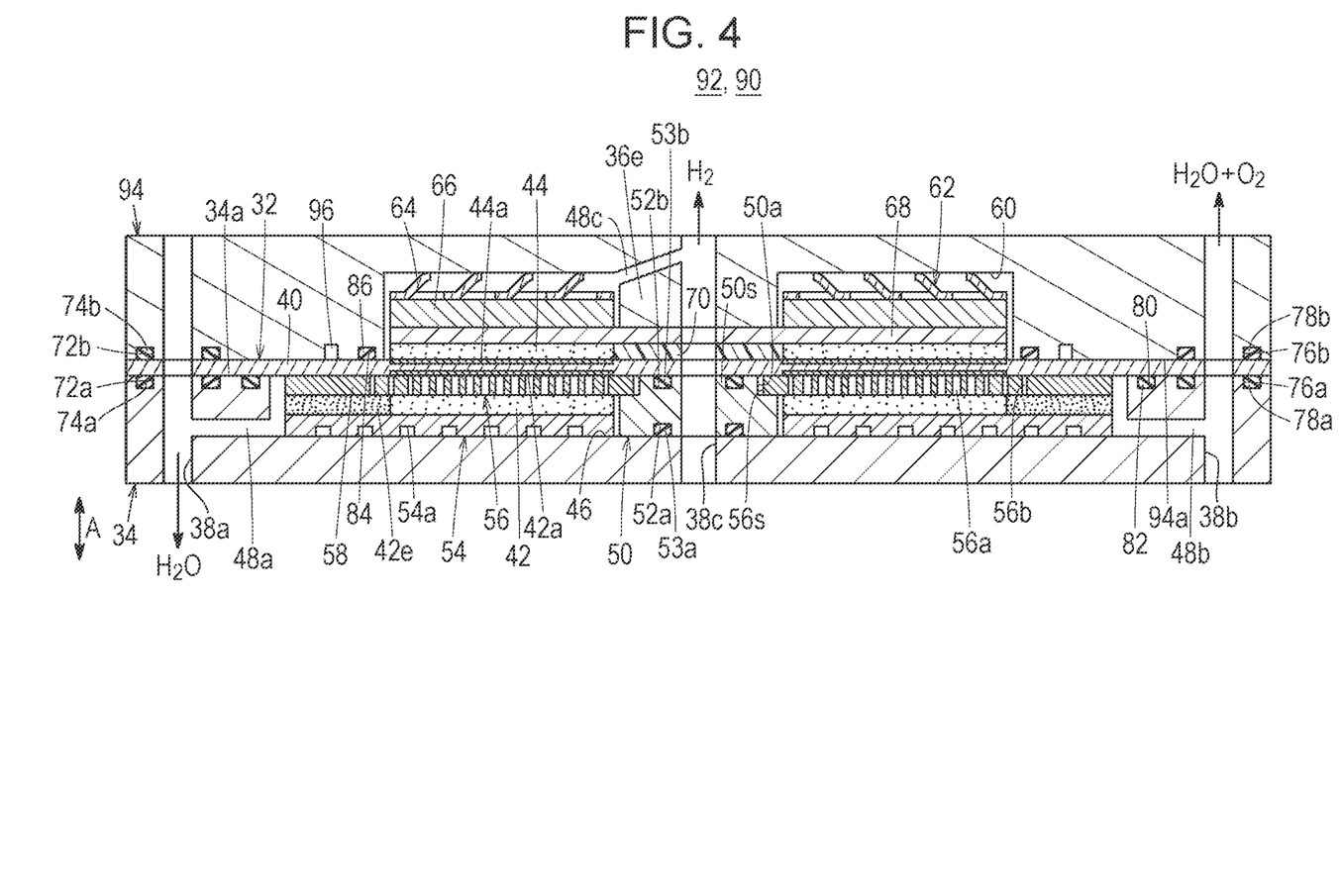
FIG. 4 is a cross-sectional view of a principal portion of a high-pressure water electrolysis cell that is included in a differential pressure water electrolysis apparatus according to a second embodiment of the present disclosure.

FIG. 4 is a cross-sectional view of a principal portion of a high-pressure water electrolysis cell 92 that is included in a differential pressure water electrolysis apparatus 90 according to a second embodiment of the present disclosure.

Note that components that are the same as the components of the differential pressure water electrolysis apparatus 10 according to the first embodiment are denoted by the same reference numerals, and detailed descriptions thereof will be omitted. Similarly, in third to fifth embodiments, which will be described later, components that are the same as the components of the differential pressure water electrolysis apparatus 10 according to the first embodiment are denoted by the same reference numerals, and detailed descriptions thereof will be omitted.

The high-pressure water electrolysis cell 92 includes a cathode separator 94. In a surface of 94a of the cathode separator 94, the surface 94a facing the solid polymer electrolyte membrane 40, a plurality of openings that are, for example, a plurality of grooves 96 having a rectangular shape (may be one of various shapes, such as a square shape and a circular shape) are formed in radial directions at positions outside the cathode-chamber-sealing member 86.

In the differential pressure water electrolysis apparatus 90 according to the second embodiment, which has the above-described configuration, the plurality of grooves 96 are formed in the cathode separator 94 in a region in which a high-pressure compressive force acts on the solid polymer electrolyte membrane 40. Thus, advantageous effects similar to those of the above-described first embodiment may be obtained, the advantageous effects including suppression of the elongation of the solid polymer electrolyte membrane 40 and suppression of a reduction in the thickness of the solid polymer electrolyte membrane 40 with certainty.

Figure 5:
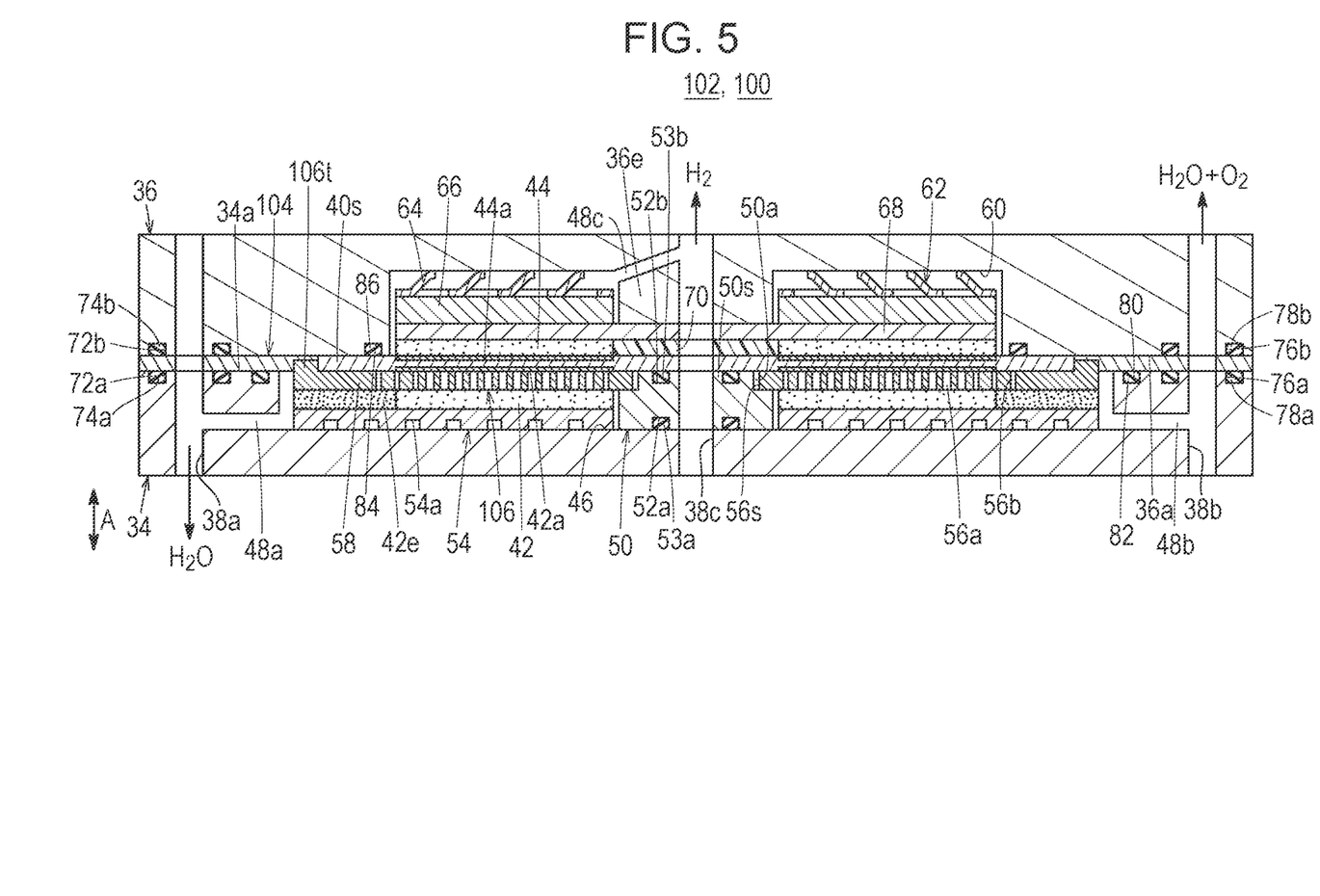
FIG. 5 is a cross-sectional view of a principal portion of a high-pressure water electrolysis cell that is included in a differential pressure water electrolysis apparatus according to a third embodiment of the present disclosure.

FIG. 5 is a cross-sectional view of a principal portion of a high-pressure water electrolysis cell 102 that is included in a differential pressure water electrolysis apparatus 100 according to a third embodiment of the present disclosure.

The high-pressure water electrolysis cell 102 includes an electrolyte membrane/electrode structure 104 that includes a solid polymer electrolyte membrane 40s having a diameter smaller than that of the solid polymer electrolyte membrane 40. A ring-shaped protective-sheet member 106 is interposed between the anode current collector 42 and the solid polymer electrolyte membrane 40s. A protruding portion 106t that protrudes toward the side on which the solid polymer electrolyte membrane 40s is disposed is formed on an outer circumferential portion of the protective-sheet member 106 in such a manner as to extend around the outer circumferential portion. The protruding portion 106t is in contact with the outer periphery end of the solid polymer electrolyte membrane 40s.

In the differential pressure water electrolysis apparatus 100 according to the third embodiment, which has the above-described configuration, even if the solid polymer electrolyte membrane 40s is caused to elongate outward by high-pressure compression, the solid polymer electrolyte membrane 40s makes contact with the protruding portion 106t, so that the elongation of the solid polymer electrolyte membrane 40s may be suppressed. Thus, advantageous effects similar to those of the above-described first and second embodiments may be obtained, the advantageous effects including suppression of the elongation of the solid polymer electrolyte membrane 40s and suppression of a reduction in the thickness of the solid polymer electrolyte membrane 40s with certainty.

Figure 6:
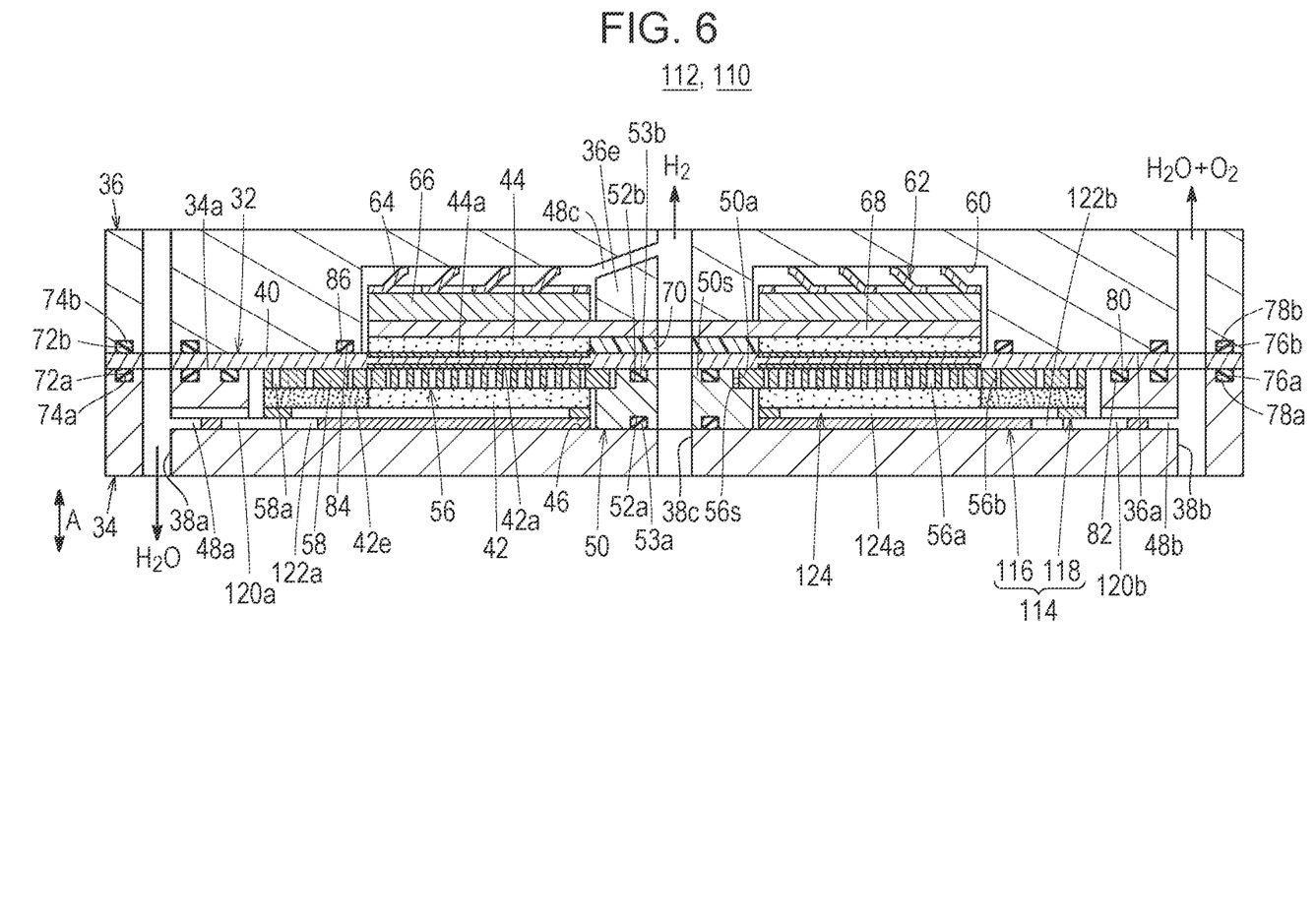
FIG. 6 is a cross-sectional view of a principal portion of a high-pressure water electrolysis cell that is included in a differential pressure water electrolysis apparatus according to a fourth embodiment of the present disclosure.

FIG. 6 is a cross-sectional view of a principal portion of a high-pressure water electrolysis cell 112 that is included in a differential pressure water electrolysis apparatus 110 according to a fourth embodiment of the present disclosure.

Figure 7:
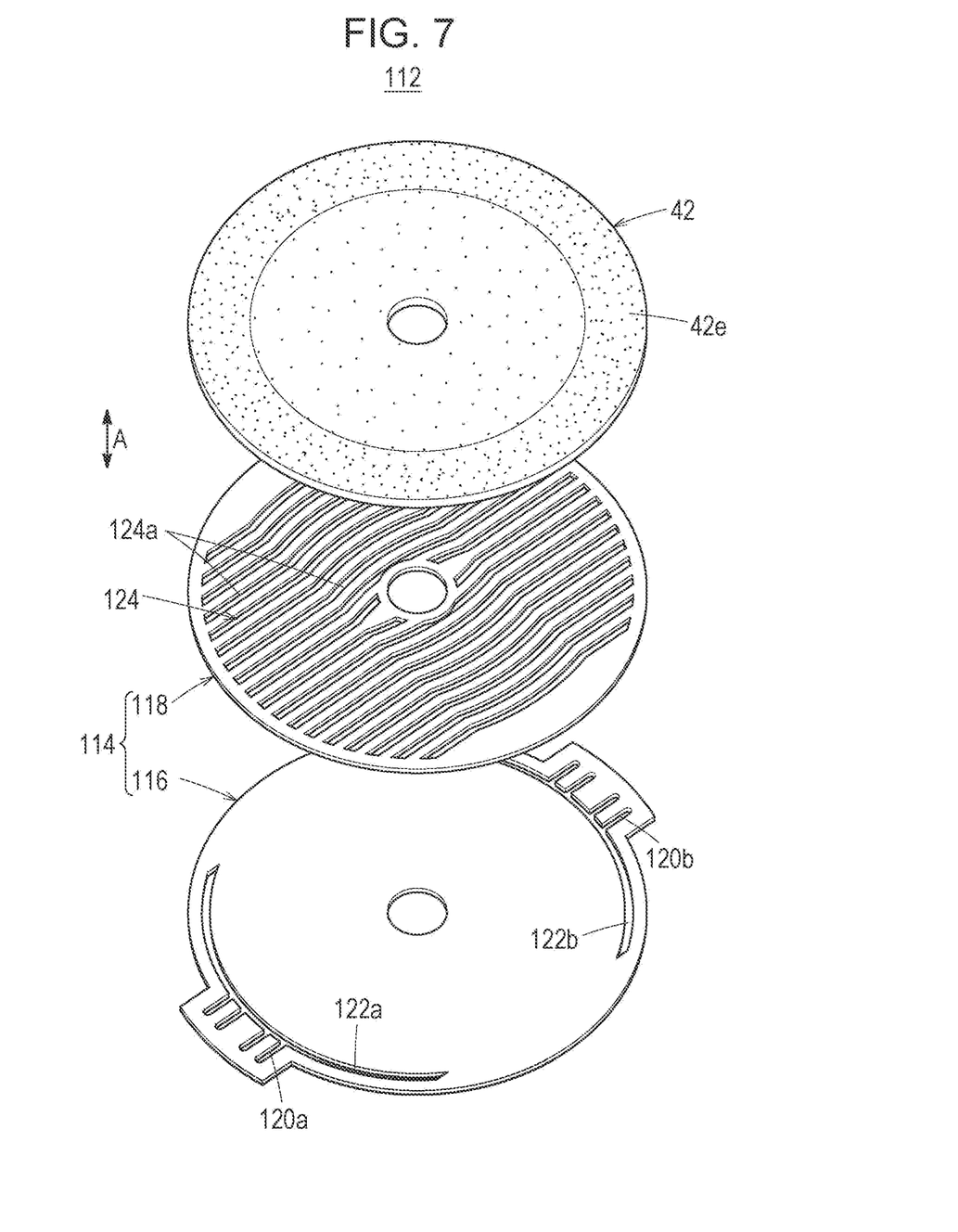
FIG. 7 is an exploded perspective view of a water-flow-path member that is included in the high-pressure water electrolysis cell.

The high-pressure water electrolysis cell 112 includes a water-flow-path member 114 that is disposed in the anode chamber 46 of the anode separator 34. As illustrated in FIG. 6 and FIG. 7, the water-flow-path member 114 includes a water-diffusion plate 116 and a water-flow-path-groove plate 118 that are integrally formed by being joined together.

The water-diffusion plate 116 has a substantially ring-like shape and includes a first protruding portion protruding toward the side on which the water-supply manifold 38a is formed. A plurality of inlet-connection flow paths 120a that are in communication with the water-supply manifold 38a are formed in the first protruding portion. In addition, the water-diffusion plate 116 includes a second protruding portion protruding toward the side on which the water-discharge manifold 38b is formed, and a plurality of outlet-connection flow paths 120b that are in communication with the water-discharge manifold 38b are formed in the second protruding portion.

An inlet-diffusion portion 122a, which has an arc shape and which are integrally in communication with the plurality of inlet-connection flow paths 120a, and an outlet-diffusion portion 122b, which has an arc shape and which are integrally in communication with the plurality of outlet-connection flow paths 120b, are formed in the water-diffusion plate 116. The inlet-diffusion portion 122a and the outlet-diffusion portion 122b are located in radial directions at positions outside the holes 58a, which are anchor portions of the protective-sheet member 56 (see FIG. 6).

The water-flow-path-groove plate 118 has a substantially ring-like shape. A plurality of water-flow-path grooves 124a are formed so as to be approximately parallel to one another on a plate surface of the water-flow-path-groove plate 118, and the ends of each of the water-flow-path grooves 124a are each in communication with one of the inlet-diffusion portion 122a and the outlet-diffusion portion 122b. The plurality of water-flow-path grooves 124a form a water-flow path 124. The anode current collector 42 is superposed on the water-flow-path-groove plate 118.

In the differential pressure water electrolysis apparatus 110, which has the above-described configuration, water supplied to the water-supply manifold 38a is introduced into the inlet-diffusion portion 122a from the plurality of inlet-connection flow paths 120a of the water-flow-path member 114 and then flows along the water-flow-path grooves 124a. In this case, the water passes through the anode current collector 42 and is electrolyzed by the anode-electrode-catalyst layer 42a, and hydrogen ions, electrons, and oxygen are generated. As a result, the hydrogen ions generated by an anodic reaction flows to the side on which the cathode-electrode-catalyst layer 44a is present by passing through the solid polymer electrolyte membrane 40 and combine with the electrons to form hydrogen.

In general, some of the holes 58a, which are disposed in radial directions at positions outside the cathode-chamber-sealing member 86 and which are anchor portions, and the inlet-diffusion portion 122a are superposed with one another in the stacking direction, and some of the holes 58a and the outlet-diffusion portion 122b are superposed with one another in the stacking direction. Consequently, a portion that is superposed with the inlet-diffusion portion 122a in the stacking direction and a portion that is superposed with the outlet-diffusion portion 122b in the stacking direction become deformed by receiving high pressure. Therefore, it is difficult to obtain a desired anchor effect, and there is a possibility that the cathode-chamber-sealing member 86 will project out.

In this case, in the fourth embodiment, the inlet-diffusion portion 122a and the outlet-diffusion portion 122b are disposed in radial directions at positions outside the holes 58a, which are anchor portions of the protective-sheet member 56. Accordingly, a desired anchor effect may be obtained, and advantageous effects similar to those of the above-described first and second embodiments may be obtained.

Figure 8:
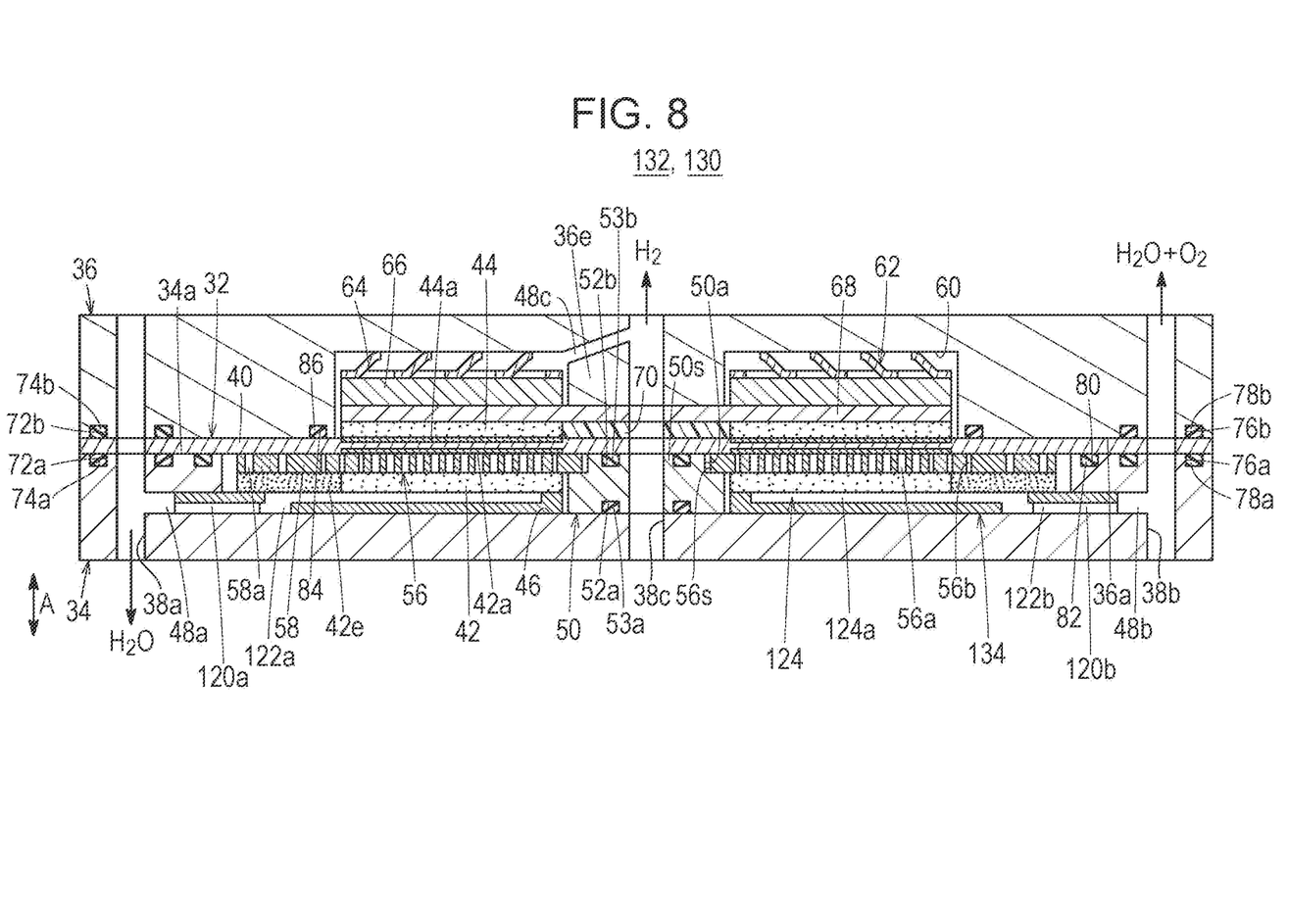
FIG. 8 is a cross-sectional view of a principal portion of a high-pressure water electrolysis cell that is included in a differential pressure water electrolysis apparatus according to a fifth embodiment of the present disclosure.

FIG. 8 is a cross-sectional view of a principal portion of a high-pressure water electrolysis cell 132 that is included in a differential pressure water electrolysis apparatus 130 according to a fifth embodiment of the present disclosure.

Figure 9:
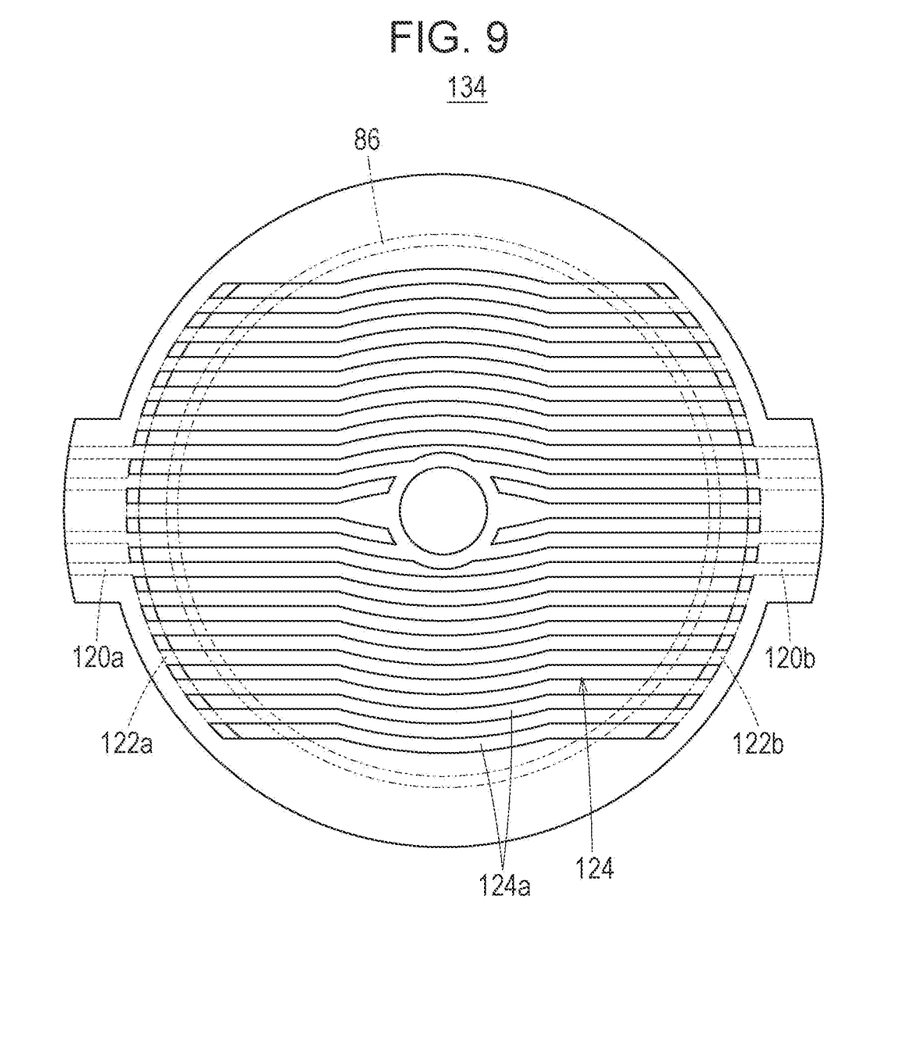
FIG. 9 is a front view of a water-flow-path member that is included in the high-pressure water electrolysis cell.

The high-pressure water electrolysis cell 132 includes a water-flow-path member 134 that is disposed in the anode chamber 46 of the anode separator 34. As illustrated in FIG. 8 and FIG. 9, the water-flow-path member 134 is formed of a single plate that is formed of the water-diffusion plate 116 and the water-flow-path-groove plate 118 of the fourth embodiment integrated with each other. Note that components that are the same as the components of the differential pressure water electrolysis apparatus 110 according to the fourth embodiment are denoted by the same reference numerals, and detailed descriptions thereof will be omitted.

In the fifth embodiment, since the differential pressure water electrolysis apparatus 130, which has the above-described configuration, includes the single water-flow-path member 134, the configuration of the differential pressure water electrolysis apparatus 130 may be further simplified, and advantageous effects similar to those of the above-described fourth embodiment may be obtained.

A differential pressure water electrolysis apparatus according to the present disclosure includes a plurality of high-pressure water electrolysis cells. Each of the plurality of high-pressure water electrolysis cells includes an electrolyte membrane, an anode current collector and a cathode current collector that are disposed at either side of the electrolyte membrane, an anode separator that has an anode chamber in which the anode current collector is accommodated, and a cathode separator that has a cathode chamber in which the cathode current collector is accommodated.

Each of the plurality of high-pressure water electrolysis cells electrolyzes water, which is supplied to the high-pressure water electrolysis cell, in such a manner as to generate oxygen on a side on which the anode current collector is disposed and high-pressure hydrogen having a pressure higher than a pressure of the oxygen on a side on which the cathode current collector is disposed. The plurality of high-pressure water electrolysis cells are stacked on top of one another to form the differential pressure water electrolysis apparatus.

The differential pressure water electrolysis apparatus includes a pressing mechanism that presses the high-pressure water electrolysis cells, which are stacked on top of one another, in a direction in which the high-pressure water electrolysis cells are stacked on top of one another. One or more openings are formed on a surface of a member that is in contact with the electrolyte membrane.

It is preferable that the differential pressure water electrolysis apparatus further include a sealing member extending around the cathode current collector in such a manner as to seal the cathode current collector outside an electrolytic region and a protective-sheet member that is disposed between the electrolyte membrane and the anode current collector and that has a plurality of holes each formed so as to correspond to the electrolytic region. In this case, it is preferable that the protective-sheet member include a frame portion outside the electrolytic region, and it is preferable that the frame portion have the one or more openings disposed in radial directions at positions outside the sealing member.

It is preferable that the differential pressure water electrolysis apparatus further include a knock member. It is preferable that a hydrogen manifold be formed in such a manner as to pass through a center portion of the anode current collector and a center portion of the cathode current collector and to enable hydrogen to flow through the hydrogen manifold, and it is preferable that the knock member be disposed between the anode chamber and the hydrogen manifold. In this case, it is preferable that the knock member include a holding portion that holds the protective-sheet member, and it is preferable that a space be formed between the protective-sheet member and the knock member when the protective-sheet member is held by the holding portion.

It is preferable that, in the differential pressure water electrolysis apparatus, a plurality of the openings be formed in such a manner as to extend in a circumferential direction of the frame portion, and it is preferable that each of the openings have a rectangular shape and long sides extending in the circumferential direction.

According to the present disclosure, one or more openings are formed in a surface of a member that is in contact with an electrolyte membrane. Thus, particularly in a region in which a high-pressure compressive force acts on the electrolyte membrane, the electrolyte membrane may fit into the one or more openings of the member, and elongation of the electrolyte membrane may be suppressed. Therefore, a reduction in the thickness of the electrolyte membrane due to high-pressure compression may be suppressed with certainty with a simple configuration, and a water-electrolysis operation may be continued efficiently.

Obviously, numerous modifications and variations of the present invention are possible in light of the above teachings. It is therefore to be understood that within the scope of the appended claims, the invention may be practiced otherwise than as specifically described herein.

What is claimed is:

1. A differential pressure water electrolysis apparatus comprising:
a plurality of high-pressure water electrolysis cells that are stacked on top of one another; and
a pressing mechanism that presses the high-pressure water electrolysis cells, which are stacked on top of one another, in a direction in which the high-pressure water electrolysis cells are stacked on top of one another,
wherein each of the plurality of high-pressure water electrolysis cells includes
an electrolyte membrane having an anode catalyst layer that defines an electrolytic region,
an anode current collector and a cathode current collector that are disposed at either side of the electrolyte membrane,
an anode separator that has an anode chamber in which the anode current collector is accommodated,
a cathode separator that has a cathode chamber in which the cathode current collector is accommodated,
a protective-sheet member that is disposed between the electrolyte membrane and the anode current collector, and
a sealing member extending around the cathode current collector in such a manner as to seal the cathode current collector outside the electrolytic region,
wherein each of the plurality of high-pressure water electrolysis cells electrolyzes water, which is supplied to the high-pressure water electrolysis cell, in such a manner as to generate oxygen on a side on which the anode current collector is disposed and high-pressure hydrogen having a pressure higher than a pressure of the oxygen on a side on which the cathode current collector is disposed,
wherein one or more openings are formed on a surface of the protective-sheet member at radial directions outside the electrolytic region,
wherein the protective-sheet member includes a frame portion outside the electrolytic region, and
wherein the frame portion has the one or more openings disposed in radial directions at positions outside the sealing member.

2. The differential pressure water electrolysis apparatus according to claim 1,
wherein the protective-sheet member has a plurality of holes each formed so as to correspond to the electrolytic region.

3. The differential pressure water electrolysis apparatus according to claim 2, further comprising:
a knock member,
wherein a hydrogen manifold is formed in such a manner as to pass through a center portion of the anode current collector and a center portion of the cathode current collector and to enable hydrogen to flow through the hydrogen manifold,
wherein the knock member is disposed between the anode chamber and the hydrogen manifold and includes a holding portion that holds the protective-sheet member, and
wherein a space is formed between the protective-sheet member and the knock member when the protective-sheet member is held by the holding portion.

4. The differential pressure water electrolysis apparatus according to claim 2,
wherein a plurality of the openings are formed in such a manner as to extend in a circumferential direction of the frame portion, and
wherein each of the openings has a rectangular shape and long sides extending in the circumferential direction.

5. The differential pressure water electrolysis apparatus according to claim 1,
wherein the protective-sheet member includes an outer circumferential portion outside the electrolytic region, and
wherein the outer circumferential portion has a plurality of openings disposed in radial directions at positions outside the sealing member, the openings having long sides such that portions of the electrolyte membrane extend into the openings.

6. The differential pressure water electrolysis apparatus according to claim 1, further comprising a knock member including a holding portion that holds the protective-sheet member, the knock member having an inner circumferential surface that is contiguous with a hydrogen manifold that passes through a center portion of the anode current collector.

7. A differential pressure water electrolysis apparatus comprising:
high-pressure water electrolysis cells stacked in a stacking direction, each of the high-pressure water electrolysis cells comprising:
an electrolyte membrane having a first side and a second side opposite to the first side in the stacking direction, and having an anode catalyst layer that defines an electrolytic region;
a protective-sheet member having a surface which has an opening and which is in contact with the electrolyte membrane;
an anode current collector disposed on the first side of the electrolyte membrane;
a cathode current collector disposed on the second side of the electrolyte membrane;
an anode separator having an anode chamber in which the anode current collector is accommodated;
a cathode separator having a cathode chamber in which the cathode current collector is accommodated;
a sealing member extending around the cathode current collector in such a manner as to seal the cathode current collector outside the electrolytic region;
each of the high-pressure water electrolysis cells being to electrolyze water supplied to each of the high-pressure water electrolysis cells to generate oxygen on an anode current collector side on which the anode current collector is disposed and to generate high-pressure hydrogen having a pressure higher than a pressure of the oxygen on a cathode current collector side on which the cathode current collector is disposed; and
the opening is formed on a surface of the protective-sheet member at a radial direction outside an electrolytic region; and
a pressing mechanism to press the high-pressure water electrolysis cells in the stacking direction,
wherein the protective-sheet member includes a frame portion outside the electrolytic region, and
wherein the frame portion has the opening disposed in the radial direction at a position outside the sealing member.

8. The differential pressure water electrolysis apparatus according to claim 7, wherein the protective-sheet member is disposed between the electrolyte membrane and the anode current collector and has holes each provided so as to correspond to the electrolytic region.

9. The differential pressure water electrolysis apparatus according to claim 8, further comprising:
a knock member; and
a hydrogen manifold passing through a center portion of the anode current collector and a center portion of the cathode current collector to enable hydrogen to flow through the hydrogen manifold,
wherein the knock member is disposed between the anode chamber and the hydrogen manifold and includes a holding portion to hold the protective-sheet member, and
wherein a space is provided between the protective-sheet member and the knock member in a state in which the protective-sheet member is held by the holding portion.

10. The differential pressure water electrolysis apparatus according to claim 8,
wherein the opening includes a plurality of openings, and
wherein the plurality of openings are alternately arranged in rows in radial directions of the frame portion.

11. The differential pressure water electrolysis apparatus according to claim 8,
wherein the holes include first through holes provided in the electrolytic region and second through holes provided at positions outside the first through holes in radial directions of the protective-sheet member,
wherein a density at which the first through holes are arranged is larger than a density at which the second through holes are arranged, and
wherein an opening diameter of each of the first through holes is larger than an opening diameter of each of the second through holes.

12. The differential pressure water electrolysis apparatus according to claim 7,
wherein the opening includes a plurality of openings,
wherein the plurality of openings extend in a circumferential direction of a frame portion, and
wherein each of the plurality of openings has a rectangular shape and long sides extending in the circumferential direction.

13. The differential pressure water electrolysis apparatus according to claim 7,
wherein the protective-sheet member includes an outer circumferential portion outside the electrolytic region, and
wherein the outer circumferential portion has a plurality of openings disposed in radial directions at positions outside the sealing member, the openings having long sides such that portions of the electrolyte membrane extend into the openings.

14. The differential pressure water electrolysis apparatus according to claim 7, further comprising a knock member including a holding portion that holds the protective-sheet member, the knock member having an inner circumferential surface that is contiguous with a hydrogen manifold that passes through a center portion of the anode current collector.

15. A differential pressure water electrolysis apparatus comprising:
a plurality of high-pressure water electrolysis cells that are stacked on top of one another; and
a pressing mechanism that presses the high-pressure water electrolysis cells, which are stacked on top of one another, in a direction in which the high-pressure water electrolysis cells are stacked on top of one another,
wherein each of the plurality of high-pressure water electrolysis cells includes
an electrolyte membrane having an anode catalyst layer that defines an electrolytic region,
an anode current collector and a cathode current collector that are disposed at either side of the electrolyte membrane,
an anode separator that has an anode chamber in which the anode current collector is accommodated, and
a cathode separator that has a cathode chamber in which the cathode current collector is accommodated,
wherein each of the plurality of high-pressure water electrolysis cells electrolyzes water, which is supplied to the high-pressure water electrolysis cell, in such a manner as to generate oxygen on a side on which the anode current collector is disposed and high-pressure hydrogen having a pressure higher than a pressure of the oxygen on a side on which the cathode current collector is disposed, and
wherein one or more openings devoid of a sealing member are formed on a surface of the cathode separator at radial directions outside the electrolytic region, the electrolyte membrane being configured to extend into the one or more openings.

16. A differential pressure water electrolysis apparatus comprising:
high-pressure water electrolysis cells stacked in a stacking direction, each of the high-pressure water electrolysis cells comprising:
an electrolyte membrane having a first side and a second side opposite to the first side in the stacking direction, and having an anode catalyst layer that defines an electrolytic region;
an anode current collector disposed on the first side of the electrolyte membrane;
a cathode current collector disposed on the second side of the electrolyte membrane;
an anode separator having an anode chamber in which the anode current collector is accommodated;
a cathode separator having a cathode chamber in which the cathode current collector is accommodated and a surface which is in contact with the electrolyte membrane, the surface having an opening;
each of the high-pressure water electrolysis cells being to electrolyze water supplied to each of the high-pressure water electrolysis cells to generate oxygen on an anode current collector side on which the anode current collector is disposed and to generate high-pressure hydrogen having a pressure higher than a pressure of the oxygen on a cathode current collector side on which the cathode current collector is disposed; and
the opening is devoid of a sealing member and is formed on the surface of the cathode separator at a radial direction outside an electrolytic region such that the
electrolyte membrane is configured to extend into the opening; and
a pressing mechanism to press the high-pressure water electrolysis cells in the stacking direction.

* * * * *